United States Patent [19]

Ricciardi et al.

[11] Patent Number: 4,741,951

[45] Date of Patent: May 3, 1988

[54] METHOD FOR FORMING THERMOFORMABLE POLYURETHANE FOAM ARTICLES

[75] Inventors: Michael A. Ricciardi, Statesville; Gregory W. Howard, Charlotte, both of N.C.

[73] Assignee: Reeves Bros., Inc., Spartanburg, S.C.

[21] Appl. No.: 8,437

[22] Filed: Jan. 29, 1987

[51] Int. Cl.$^4$ .................. B32B 3/26; B32B 31/04; B32B 31/20; C08G 18/14

[52] U.S. Cl. .................. 428/316.6; 264/321; 428/318.4; 428/921; 521/137

[58] Field of Search .............. 264/321; 428/316.6, 428/318.4, 921; 521/137

[56] References Cited

U.S. PATENT DOCUMENTS

| | | | |
|---|---|---|---|
| 3,215,652 | 11/1965 | Kaplan | 521/160 |
| 4,119,749 | 10/1978 | Roth et al. | 428/99 |
| 4,265,851 | 5/1981 | Roth | 264/321 |
| 4,327,005 | 4/1982 | Ramlow et al. | 524/377 |
| 4,334,031 | 6/1982 | Otten et al. | 521/106 |
| 4,334,049 | 6/1982 | Ramlow et al. | 526/202 |
| 4,359,550 | 11/1982 | Narayan et al. | 524/871 |
| 4,435,592 | 3/1984 | Reichel | 560/91 |
| 4,451,310 | 5/1984 | Lairloup | 156/78 |
| 4,454,255 | 6/1984 | Ramlow et al. | 521/137 |
| 4,458,038 | 6/1984 | Ramlow et al. | 521/137 |
| 4,458,050 | 7/1984 | Heyman | 524/726 |
| 4,482,651 | 11/1984 | Reichel et al. | 521/115 |
| 4,487,853 | 12/1984 | Reichel et al. | 521/172 |
| 4,487,854 | 12/1984 | Hartman | 521/174 |
| 4,503,193 | 3/1985 | Heyman | 525/205 |
| 4,503,207 | 3/1985 | Heyman | 526/307.5 |
| 4,508,774 | 4/1985 | Grabhoefer et al. | 428/220 |
| 4,522,976 | 6/1985 | Grace et al. | 524/722 |
| 4,529,746 | 7/1985 | Markovs et al. | 521/159 |
| 4,536,557 | 8/1985 | Heyman | 528/52 |
| 4,550,194 | 10/1985 | Reichel et al. | 560/200 |
| 4,555,527 | 11/1985 | Heyman | 521/67 |
| 4,568,705 | 2/1986 | Grace et al. | 521/137 |
| 4,652,589 | 3/1987 | Simroth et al. | 521/137 |
| 4,654,105 | 3/1987 | Fesman | 428/290 |
| 4,689,357 | 8/1987 | Hongu et al. | 521/137 |

FOREIGN PATENT DOCUMENTS

| | | |
|---|---|---|
| 1209737 | 8/1986 | Canada . |
| 116309 | 8/1984 | European Pat. Off. . |
| 50-89475 | 7/1975 | Japan . |
| 54-26283 | 2/1979 | Japan . |
| 2028714 | 3/1980 | United Kingdom . |
| 2147595 | 5/1985 | United Kingdom . |

OTHER PUBLICATIONS

Kuryla et al, "Polymer/Polyols," J. Cell. Plsts. Mar., 1966.

Vehlewald et al, "PHD Polyethers," Kunststoffe 73 (1983) 8, pp. 439–443.

BASF Press Release: New Urethane Foam Technology, Mar. 25, 1983.

BASF Urethane Chemicals.

BASF Graft Polyols Handbook.

Primary Examiner—William J. Van Balen
Attorney, Agent, or Firm—Pennie & Edmonds

[57] ABSTRACT

A method for manufacturing a molded polyurethane article from a polyurethane foam forming composition, wherein the composition includes a polyol, an organic isocyanate compound and water, with the polyol being a polymer dispersion formed by free radical initiated polymerization of an ethylenically unsaturated monomer mixture having between 51 and 99 weight percent of an acrylic monomer with a polyoxyalkylene polyether polyol, wherein the monomer mixture represents between about 25 to 75 weight percent of the dispersion. After the foam is formed from the foam forming composition, it is molded under heat and pressure to form a molded polyurethane article.

33 Claims, No Drawings

METHOD FOR FORMING THERMOFORMABLE POLYURETHANE FOAM ARTICLES

FIELD OF THE INVENTION

The present invention relates to methods for manufacturing thermoformed polyurethane articles and the articles formed thereby.

BACKGROUND ART

Thermoformed foam articles have great utility in a variety of industries. Major applications include trim panels, headliners and vehicle trim in the automotive, aircraft and railway industries.

Representative patents disclosing thermoformed foam products include U.S. Pat. Nos. 4,119,749, 4,265,851, 4,451,310 and 4,508,774 and Great Britain Patent Specification No. 2,028,714.

Applicants now have discovered that a new class of polyols are capable of forming thermoformable polyurethane foam

SUMMARY OF THE INVENTION

The present invention relates to a method for manufacturing a molded polyurethane article which comprises preparing a polyurethane foam forming composition of specific ingredients, forming a thermoformable polyurethane foam from the foam forming composition and molding the thermoformable polyurethane form under heat and pressure to form a molded polyurethane foam article. The foam forming components generally include a polyol, an organic isocyanate compound and water. The polyol comprises a polymer dispersion formed by polymerization of an ethylenically unsaturated monomer mixture that has at least 51 to 99 weight percent of an acrylic monomer with a polyoxyalkylene polyether polyol. The monomer mixture represents between 25 and 75 weight percent of the dispersion while the polyether polyol represents the remainder.

Regarding the monomer mixture, more preferred amounts of acrylic monomer include 55 to 85 weight percent, 60 to 80 weight percent and most particularly 65 to 75 weight percent. The most advantageous acrylic monomers are acrylonitrile or methacrylonitrile, while the remainder of the monomer mixture preferably comprises styrene, methyl styrene, vinyl benzene or vinyl toluene. The optimum monomer mixture would be a 2 to 1 ratio of acrylonitrile to styrene.

The relative amounts of monomer mixture and polyol can preferably range from between 40 and 60 weight percent, more preferably between 45 and 55 weight percent, with the most advantageous formulation being equal amounts of each component (i.e. 50:50).

The most advantageous polyoxyethylene polyether polyols are the ethylene oxide or propylene oxide adducts of ethylene glycol, propylene glycol or a butane diol. The most specific compound which provides the best results is a propylene oxide adduct of propylene glycol.

The polymer dispersion is normally polymerized by free radical initiated reaction of the monomer mixture and the polyol.

The thermoformable polyurethane foam of the invention is formed from the foam forming components in a manner which is well known in the art. The foam is then molded at a temperature between about 300° and 400° F., preferably between 325° and 375° F. to form the desired article. If necessary or desired, the foam forming composition can contain flame retardant additives to impart fire retardance to the resulting article. Also, the article may include a reinforcing backing or decorative layer which is incorporated with the foam prior to the thermoforming step.

The invention also relates to the articles formed by the preceding methods, whether or not such articles include reinforcement, backing or decorative layers, or other visually appealing or structurally useful components.

DETAILED DESCRIPTION OF THE INVENTION

In accordance with the teachings of the present invention, special graft polymer dispersions are used as polyols in the preparation of thermoformable polyurethane foams. The use of such graft polymer dispersions results in the foam being of a thermoformable nature whereby subjecting the foam to heat and pressure allows a compressed foam article to be manufactured.

The polyols which are useful in this invention are polymer dispersions formed by polymerization of an ethylenically unsaturated monomer mixture that contains between 51 and 99 weight percent of an acrylic monomer, and a polyoxyalkylene polyether polyol.

Representative ethylenically unsaturated monomers which may be employed in the monomer mixtures of present invention include butadiene, isoprene, 1,4-pentadiene, 1,6-hexadiene, norbornadiene, 1,7-octadiene, styrene, alpha-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostryrene, nitrostyrene, N,N-dimethylaminostyrene, acetoxystyrene, methyl 4-vinylbenzoate, phenoxystyrene, p-vinylphenyl oxide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3-4-dihydro-1,2-pyran, 2-butoxy-2'-vinyloxy diethyl ether, vinyl methyl ketone, vinyl ethyl ketone, vinyl phosphonates such as vinyl phenyl ketone, n-vinyl carbazole, vinyl ethyl sulfone, N-methyl-N-vinyl acetamide, N-vinylpyrrolidone, vinyl imidazole, divinyl benzene, divinyl sulfoxide, divinyl sulfone, sodium vinylsufonate, methylvinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Of these compounds, styrene, methylstyrene, vinyl benzene or vinyl toluene are the most preferred.

In these monomer mixtures, the amount of acrylic monomers should be at least 51 weight percent and preferably between 55 and 85 or between 60 and 80 weight percent. Suitable acrylic monomers include acrylonitrile, methacrylonitrile, acrylic acid, methacrylic acid, methyl acrylate, 2-hydroxethyl acrylate, methyl methacrylate, cyclohexyl methacrylate, benzyl methacrylate, isopropyl methacrylate, octyl methacrylate, ethyl a-ethoxyacrylate, methyl alphaacetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like, with acrylonitrile and methacrylonitrile being the most preferred acrylic monomers.

The suitable polyoxyalkylene polyether polyols include the polymerization products of an alkylene oxide or a mixture of alkylene oxides with a polyhydric alcohol. Suitable polyhydric alcohols include both aliphatic and aromatic compounds used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1-6-hexanediol, 1,7-heptanediol, glycerol, 1,1,1-trimethylopropane, 1,1,1-trimethylolethane, 1,2,6-hexanetriol, a methyl glucoside, pentaerythritol, and sorbitol. Also included within the term polyhydric alcohols are compounds derived from phenol such as 2,2-bis(4-hydroxyphenyl) propane, commonly known as Bisphenol A. The most preferred polhydric alcohols are ethylene glycol, propylene glycol or a butanediol. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxpropylene glycol, polyoxbutylene glycol, polytetramethylene glycol, block copolymers, for example, combinations of polyoxpropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides of by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl) propane and blends thereof having equivalent weights of from 100 to 10,000. The preferred alkylene oxides which may be employed for the preparation of the polyether polyols include ethylene oxide, propylene oxide, butylene oxide, amylene oxide and mixtures of these oxides, most preferably ethylene and propylene oxide.

Illustrative polymerization initiators which may be employed are the well-known free radical types of vinyl polymerization initiators, such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, diacetyl peroxide, di-alpha-cumyl peroxide, dipropyl peroxide, di-isopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, a,a'-azobis-(2- methyl heptonitrile), 1,1'-azo-bis(cyclohexane carbonitrile) 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis (2,4-dimethylvaleronitrile), 2-t-butylazo-2-cyano-4-methoxy-4-methylpentane, 2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile), 2-t-butylazo-2-cyano-4-methylpentane, 2-t-butylazo-2-isobutyronitrile, to butylperoxyisopropyl carbonate and the like; a mixture of initiators may also be used. The preferred initiators are 2,2'-azobis(2-methylbutanenitrile), 2,2'-azobis-(isobutyronitrile), 2,2'-azobis(2,4-dimethylvaleronitrile), 2-t-butylazo-2-cyano-4-methoxy-4-methylpentane, 2-t-butylzao-2-cyano-4-methylpentane, and 2-t-butylazo-2-cyanobutane. Generally, from about 0.01 percent to about 5 percent, preferably from about 0.5 percent to about 1.5 percent, by weight of initiator based on the weight of the monomer will be employed in the process of the invention.

The amount of ethylenically unsaturated monomer employed in the polymerization reaction is generally from 25 percent to 75 percent, preferably from 40 percent to 60 percent, and most preferably, between 45 and 55 weight percent based on the total weight of the dispersion. The polymerization occurs at a temperature between about 25° C. and 180° C., preferably from 80° C. to 135° C.

The most preferred polyol is Pluracol 1064, available from BASF Corporation, a yellow graft polymer dispersion resulting from the polymerization of 50 weight percent 2:1 acrylonitrile:styrene and 50 weight percent of a propylene oxide adduct of propylene glycol having a hydroxyl number of about 145. The polymer has a hydroxyl number of about 68 to 71.5.

The polyurethane foams employed in the present invention are generally prepared by the reaction of a graft polymer dispersion with an organic polyisocyanate in the presence of water and optionally in the presence of additional polyhydroxyl-containing components, chain-extending agents, catalysts, surface-active agents, stabilizers, dyes, fillers and pigments. The preparation of cellular polyurethane plastic foam is well known in the art. Corresponding quantities of excess isocyanate are used to react with the water, and optionally, carbon dioxide may be used. It is possible to proceed with the preparation of the polyurethane plastics by a prepolymer technique wherein an excess of an organic isocyanate compound is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes.

The term "organic isocyanate compound" is used to describe the isocyanate or polyisocyanate compounds that are suitable for use in this invention. Such organic isocyanate compounds include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene- 1,5-diisocyanate, 1-methoxyphenyl-2,4-diisocyanate, 4,4'-diphenylmethane diisocyanate, 4,4'-biphenylene diisocyanate, 3,3-dimethoxy-4,4'-biphenyl diisocyanate, 3,3'-dimethoxy-4,4'-biphenyl diisocyanate, 3,3'-dimethyl-4,4'-biphenyl diisocyanate and 3,3'-dimethyldiphenylmethane-4,4'diisocyanate; the triisocyanates such as 4,4'4'''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred crude isocyanates are disclosed in U.S. Pat. No. 3,215,652.

The thermoforming of the polyurethane foam sheets of the invention can be accomplished in various ways. In one version, the polyurethane foam sheets are heated to their deformation temperature (i.e., between 300° and 400° F., preferably 325° to 375° F.) with the aid of infrared radiators, hot air ovens, contact hot plates or other heating means. The heated foam sheets are then placed in a forming tool or mold which is maintained either at room or a slightly elevated temperature (i.e. 70°–150° F.) and formed therein with or without the application of pressure. Preferably, pressure is applied to the mold to obtain the shape of the desired article. This method has the advantages of using molds which are made of economical materials such as wood, thermosetting plastics, gypsum or ceramics, and the ability to immediately demold the resulting molded article.

According to the preferred method, the sheets at room or a slightly elevated temperature (again, 70° to 150° F.) are placed in a temperature controlled molding tool of a metal such as steel or aluminum which tool has been heated to a temperature of between about 300° and 400° F., preferably 325° to 375° F., for a time sufficient to enable the foam to achieve the desired shape, contour and texture of the final article. The time period can range from about 30 seconds to 300 seconds or more, preferably from about 60 to 180 seconds. Again, the mold tool can be pressurized, if desired It is also possible to combine these methods to achieve rapid thermoforming of the foam. For example, the foam sheets and mold can be heated to the desired temperatures to decrease molding time.

For certain applications, the foam sheets can be provided with reinforcing, backing or decorative coverings at the same time that the article is molded by placing these desired coverings in the mold with an adhesive for bonding the covering to the foam during the molding operation. It is also possible to incorporate reinforcement in the form of cloth, scrim, fibers, or roving in the molded article by placing the reinforcement between two foam sheets which are then molded together in the manner described above.

A wide range of reinforcing or decorative coverings are available, including glass or textiles in the forms mentioned above, as well as metals, plastics, carbon or ceramic foils, sheets or particles. If desired, these coverings may be pigmented or printed.

When fire retardant articles are desired, conventional fire retardant additives may be added to the polyurethane foam forming components before forming the foam in an amount of between about 10 to 20 parts based on 100 parts polyol. Also, higher amounts may be used, if desired.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified.

Examples 1–5

The following foam formulations were prepared.

| Component | Formulation | | | | |
| --- | --- | --- | --- | --- | --- |
| | 1 | 2 | 3 | 4 | 5 |
| Polyol 1064 | 100 | 100 | 100 | 100 | 100 |
| toluene diisocyanate (80/20) | 110 | 62.5 | 54.3 | 62.5 | 37.8 |
| toluene diisocyanate (65/35) | — | — | — | — | 16.2 |
| water | 4 | 4.8 | 4.0 | 4.8 | 3.6 |
| tin catalyst | 0.35 | 0.35 | 0.35 | 0.35 | 0.5 |
| silicone stabilizing agent | 0.90 | 0.9 | 0.9 | 0.9 | 0.9 |
| amine catalyst | 0.15 | 0.15 | 0.15 | 0.15 | 0.15 |
| black pigment | 1.1 | 1.1 | 1.1 | 1.1 | 1.1 |
| flame retardant | — | — | — | — | 14.0 |

These formulations exhibited the following properties:

| Property | Formulation | | | | |
| --- | --- | --- | --- | --- | --- |
| | 1 | 2 | 3 | 4 | 5 |
| Rise time (sec.) | 111.6 | 115.6 | 94.1 | 110.5 | 90 |
| Foam condition | good | good | good | good | good |
| Foam density | 1.18 | 1.05 | 1.43 | 1.25 | 1.59 |
| Foam porosity | 0.42 | 0.4 | 0.46 | 0.45 | 0.2 |

From these foam formulations, 1" thick samples of foam were taken for subsequent thermoforming in an aluminum cover press. The mold halves were heated to approximately 325°–375° F. before each sample was placed therein. Thereafter the mold halves were forced together with hydraulic pressure and held in the closed position for approximately 2 minutes. Thereafter, the molded samples were recovered from the mold. It was found that each sample produced excellent results, with a uniform compressed condition being observed.

While it is apparent that the invention herein disclosed is well calculated to fulfill the desired results, it will be appreciated that numerous modifications and embodiments may be devised by those skilled in the art, and it is intended that the appended claims cover all such modifications and embodiments as fall within the true spirit and scope of the present invention.

What is claimed is:

1. A method for manufacturing a molded polyurethane article which comprises:
   (a) preparing a polyurethane foam-forming composition comprising a polyol, an organic isocyanate compound and water, wherein the polyol comprises a polymer dispersion formed by polymerization of
      (i) an ethylenically unsaturated monomer mixture comprising between 51 and 99 weight percent of an acrylic monomer, the mixture representing about 25 to 75 weight percent of the dispersion; and
      (ii) a polyoxyalkylene polyether polyol representing about 75 to 25 weight percent of the dispersion;
   (b) forming a thermoformable polyurethane foam from the foam-forming composition; and
   (c) molding the thermoformable polyurethane foam under heat and pressure to form a molded polyurethane article.

2. The method of claim 1 wherein the acrylic monomer is present in an amount of 55 to 85 weight percent.

3. The method of claim 1 wherein the acrylic monomer is acrylonitrile or methacrylonitrile.

4. The method of claim 2 wherein the monomer mixture comprises 45 to 15 weight percent styrene, methyl styrene, vinyl benzene or vinyl toluene.

5. The method of claim 1 wherein the monomer mixture comprises 49 to 1 weight percent styrene, methyl styrene, vinyl benzene, or vinyl toluene.

6. The method of claim 3 wherein the monomer mixture comprises 49 to 1 weight percent styrene, methyl styrene, vinyl benzene, or vinyl toluene.

7. The method of claim 1 wherein the monomer mixture is 60 to 80 weight percent acrylonitrile or methacrylonitrile and 40 to 20 weight percent styrene vinyl benzene, or vinyl toluene.

8. The method of claim 1 wherein the polyoxyethylene polyether polyol is an ethylene oxide or propylene oxide adduct of ethylene glycol, propylene glycol or a butane diol.

9. The method of claim 1 wherein the ethylenically unsaturated monomer mixture represents 40 to 60 weight percent of the dispersion and the polyol represents 60 to 40 weight percent of the dispersion.

10. The method of claim 1 wherein the polymer dispersion is formed by free radical initiated polymerization of the ethylenically unsaturated monomer mixture and polyoxyalkylene polyether polyol.

11. The method of claim 1 wherein the foam is molded at a temperature of between about 300° and 400° F.

12. The method of claim 1 wherein the foam is molded at a temperature of between about 325° and 375° F.

13. A method for manufacturing a molded polyurethane article which comprises:
   (a) preparing a thermoformable polyurethane foam by reacting water, an organic isocyanate compound and a polymer dispersion formed by free radical initiated polymerization of
      (i) an ethylenically unsaturated monomer mixture containing between 60 and 80 weight percent acrylonitrile or methacrylonitrile and between 40 and 20 weight percent styrene, vinyl benzene and vinyl toluene, the mixture representing 45 to 55 weight percent of the dispersion; and
      (ii) a polyoxyalkylene polyether polyol comprising an ethylene oxide or propylene oxide adduct of ethylene glycol or propylene glycol, the adduct representing 55 to 45 weight percent of the dispersion; and
   (b) molding the thermoformable polyurethane foam at a temperature of between about 300° and 400° F. and at a sufficient pressure to form a molded polyurethane article.

14. The method of claim 13 which further comprises imparting fire retardance to the composition by adding to the foam forming components a flame retardant additive.

15. The method of claim 13 which further comprises adding a reinforcing, backing or decorative layer to the foam prior to the thermoforming step.

16. The method of claim 15 wherein the layer is incorporated into the article by placing the layer between two sheets of foam prior to the thermoforming step.

17. The method of claim 13 wherein the monomer mixture is 2 parts acrylonitrile to one part styrene.

18. The method of claim 17 wherein the polyol is a propylene oxide adduct of propylene glycol.

19. The method of claim 18 wherein the monomer mixture and the polyol are present in substantially equal amounts.

20. The method of claim 19 wherein the foam is molded at a temperature of between 325° and 375° F.

21. A molded polyurethane article produced by the method of claim 1.

22. A molded polyurethane article produced by the method of claim 13.

23. A molded polyurethane article produced by the method of claim 15.

24. A heat molded polyurethane article comprising thermoformed polyurethane foam formed from a polyurethane foam-forming composition comprising a polyol, an organic isocyanate compound and water, wherein the polyol comprises a polymer dispersion formed by polymerization of
   (a) an ethylenically unsaturated monomer mixture comprising between 51 and 99 weight percent of an acrylic monomer, the mixture representing about 25 to 75 weight percent of the dispersion; and
   (b) a polyoxyalkylene polyether polyol representing about 75 to 25 weight percent of the dispersion.

25. The article of claim 24 wherein the acrylic monomer is acrylonitrile or methacrylonitrile and the monomer mixture further comprises 49 to 1 weight percent styrene, methyl styrene, vinyl benzene, or vinyl toluene.

26. The article of claim 24 wherein the acrylic monomer is present in an amount of 55 to 85 weight percent and the monomer mixture further comprises 45 to 15 weight percent styrene, methyl styrene, vinyl benzene or vinyl toluene.

27. The article of claim 24 wherein the monomer mixture is 60 to 80 weight percent acrylonitrile or methacrylonitrile and 40 to 20 weight percent styrene, vinyl benzene, or vinyl toluene.

28. The method of claim 1 wherein the polyoxyethylene polyether polyol is an ethylene oxide or propylene oxide adduct of ethylene glycol, propylene glycol or a butane diol, and wherein the monomer mixture represents 40 to 60 weight percent of the dispersion and the polyol represents 60 to 40 weight percent of the dispersion.

29. A heat molded polyurethane article comprising thermoformed polyurethane foam formed from the reaction of water, an organic isocyanate compound, and a polymer dispersion formed by polymerization of:
  (a) a monomer mixture of acrylonitrile or methacrylonitrile in an amount of between 60 and 80 weight percent styrene or vinyl toluene in an amount of between 40 and 20 weight percent; and
  (b) a polyol comprising a propylene oxide adduct of propylene glycol; the amount of polyol representing about 45 to 55 weight percent of the dispersion and the monomer mixture representing 55 to 45 weight percent of the dispersion.

30. The article of claim 29 further comprising a flame retardant additive for imparting fire retardance to the article.

31. The article of claim 29 further comprising one or more reinforcing, backing or decorative layers.

32. The article of claim 31 wherein the layer is incorporated into the article between two sheets of foam prior to thermoforming.

33. The article of claim 29 wherein the monomer mixture is 2 parts acrylonitrile and 1 part styrene, and wherein the monomer mixture and the polyol are present in substantially equal amounts.

* * * * *